United States Patent [19]
Lidstrom et al.

[11] 3,875,661
[45] Apr. 8, 1975

[54] FLEXIBLE PANEL SUBASSEMBLY FOR A VEHICLE

[75] Inventors: Oscar G. Lidstrom, Rochester; Richard R. Lovelace, Clarkston, both of Mich.

[73] Assignee: General Motors Corporation, Detroit, Mich.

[22] Filed: Sept. 10, 1973

[21] Appl. No.: 395,407

[52] U.S. Cl. ............ 296/28; 293/63; 267/140; 296/31 P
[51] Int. Cl. ............................................. B62d 27/00
[58] Field of Search ............ 296/28 R, 28 E, 31 P; 293/71 R, 63; 114/219; 267/140

[56] References Cited
UNITED STATES PATENTS

| | | | |
|---|---|---|---|
| 1,965,279 | 7/1934 | Clark | 293/71 R |
| 2,624,596 | 1/1953 | Clingman | 293/71 R |
| 2,829,915 | 4/1958 | Claveau | 296/28 R |
| 3,574,406 | 4/1971 | Wessell | 114/219 |
| 3,694,018 | 9/1972 | Levering | 293/88 |

*Primary Examiner*—Robert J. Spar
*Assistant Examiner*—Gary Auton
*Attorney, Agent, or Firm*—Saul Schwartz

[57] ABSTRACT

A flexible panel subassembly for installation on a vehicle body, the subassembly including a flexible panel having a peripheral contour corresponding to a similar peripheral contour on the body, a plurality of square bosses on a mounting surface of the flexible panel, a rigid reinforcing panel disposed in juxtaposition with the mounting surface, and a plurality of apertures in the reinforcing panel corresponding to the bosses. Each aperture is larger than the corresponding boss in a direction parallel to the peripheral contour so that thermal expansion and contraction of the flexible panel is directed along the peripheral contour thereby to assure a continuous contour across the interface between the flexible panel and the body.

2 Claims, 7 Drawing Figures

FLEXIBLE PANEL SUBASSEMBLY FOR A VEHICLE

This invention relates generally to vehicle body constructions and more particularly to a flexible panel subassembly adapted for installation on a vehicle body and to a procedure for fabricating the panel subassembly.

In the automotive industry, engineers have long appreciated the attractive advantages of flexible body panel sections which normally present a predetermined configuration but readily deflect under impact and thereafter spring back to their original configurations. Such a construction is particularly desirable at the front of a vehicle body rearward of the collision bumper. Significant practical problems must be solved, however, and one such problem involves the actual installation of the flexible panel on the vehicle body. More particularly, to be economically attractive, the flexible panel must be relatively large yet have thin wall sections to conserve material and maintain dimensional stability. Elastomeric molding technology has progressed to the extent that today such large, thin-section flexible panels can be quite accurately produced in economical quantities. The molded panels, however, tend to sag or twist under their own weight due to their inherent flexibility and this tendency significantly impedes the installation procedure on the vehicle body since the assembler must first align the flexible panel with respect to the body before final installation. A flexible panel subassembly and fabrication procedure therefor according to this invention provides a simplified structure for maintaining the rigidity of the flexible panel prior to arrival at the vehicle body for installation thereon so that the assembler need only attach the panel subassembly without having to first align the panel by removing any sags, twists, or the like.

The primary feature, then, of this invention is that it provides an improved flexible panel subsssembly structure and fabrication procedure, the improved panel subassembly being adapted for installation on an automobile vehicle body. Another feature of this invention is that it provides an improved flexible panel subassembly which is fabricated at a convenient location prior to installation on the vehicle body and wherein the flexible panel portion of the subassembly is maintained in a rigidified condition prior to final installation. Yet another feature of this invention is that it provides an improved flexible panel subassembly including a flexible panel defining a mounting surface having a peripheral contour complementary to the contour of the adjacent vehicle body section and a plurality of raised bosses on the mounting surface and further including a reinforcing panel having a corresponding plurality of apertures, the bosses being adapted for reception in the apertures so that the reinforcing panel maintains the flexible panel in a rigidified condition. A further feature of this invention resides in the provision of apertures in the reinforcing panel having a dimension generally parallel to the peripheral contour of the flexible panel exceeding the corresponding dimension of the corresponding boss so that thermal expansion and contraction of the flexible panel prior to final installation is directed along the peripheral contour thereby to maintain such contour. These and other features of this invention will be readily apparent from the following specification and from the drawings wherein:

Figure 1:
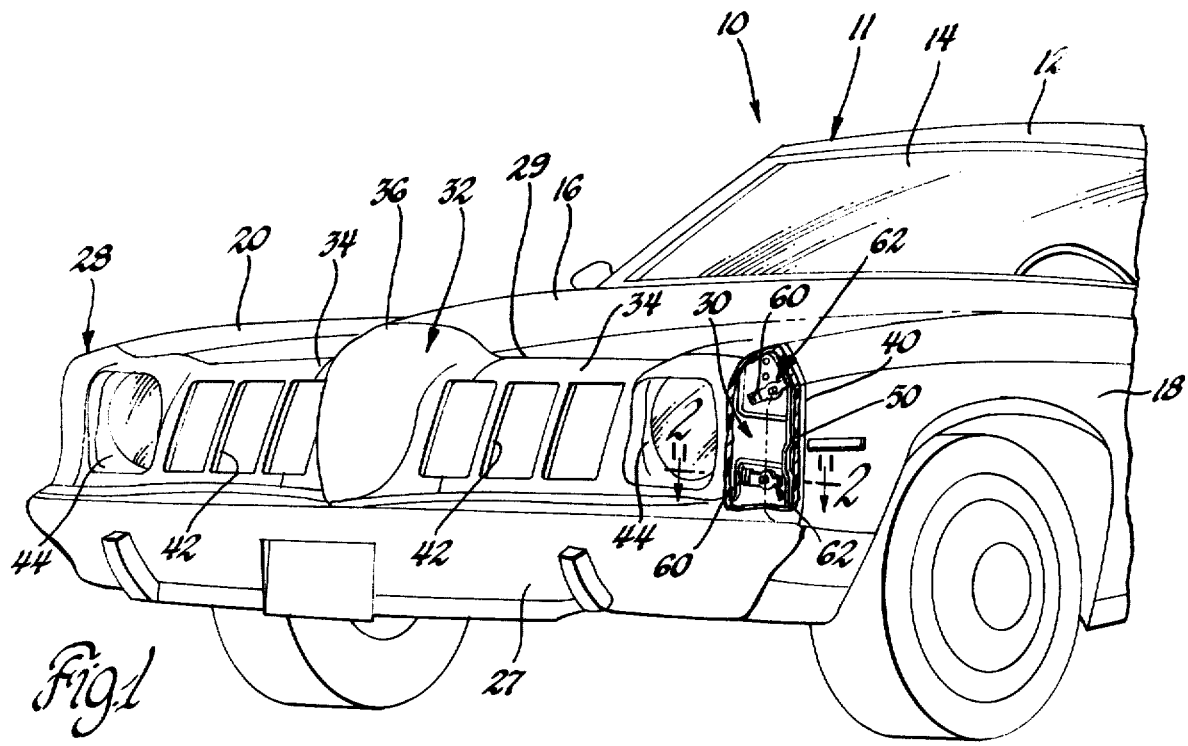
FIG. 1 is a fragmentary, partially broken away, perspective view of the forward portion of an automobile type vehicle body incorporating a flexible panel subassembly according to this invention.

Referring now to the drawings, FIG. 1 depicts the forward section of an automobile type vehicle designated generally 10 including a body portion 11 conventionally attached to a rigid frame, not shown. The body portion 11 includes a roof structure 12 defining a portion of the frame for a front windshield 14, the lower portion of the windshield frame being defined by a cowl structure, not shown. Forward of the cowl structure, the body portion 11 includes a hood 16 supported for pivotal movement between a closed position, FIGS. 1, 6 and 7, and an open position, not shown, exposing the engine compartment of the vehicle. The engine compartment is defined on the sides by a left fender structure 18 and a right fender structure 20. The left fender structure 18 includes an inturned front flange 22 and the right fender structure 20 includes a similar inturned front flange 24, FIGS. 4 and 5. The two inturned flanges 22 and 24 are situated in a common transversely oriented vertical plane of the body portion 11 as is an integral front flange 26 on the hood 16. A collision bumper bar 27 is supported on the frame of the vehicle through a pair of energy absorbing bumper supports, not shown, which permit rearward deflection of the bar 27 in response to a substantial impact thereon. Between the bumper bar 27 and a transverse planar surface of the body portion 11 defined by the flanges 22, 24 and 26, there is disposed a flexible panel subassembly according to this invention and designated generally 28, the transverse planar surface defining a marginal edge 29 of predetermined contour.

Figure 5:
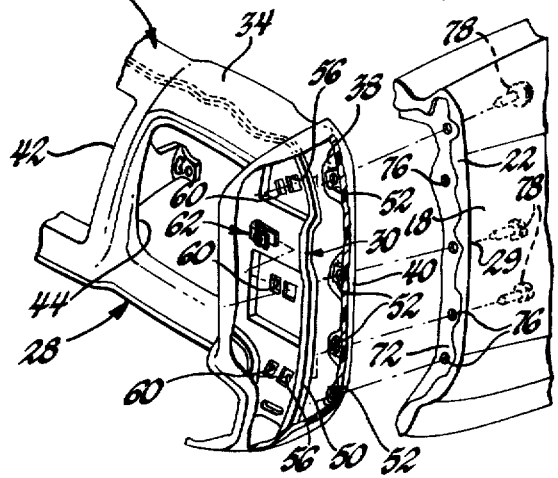
FIG. 5 is an enlarged, partially broken away, exploded view of a portion of FIG. 1.
Figure 6:
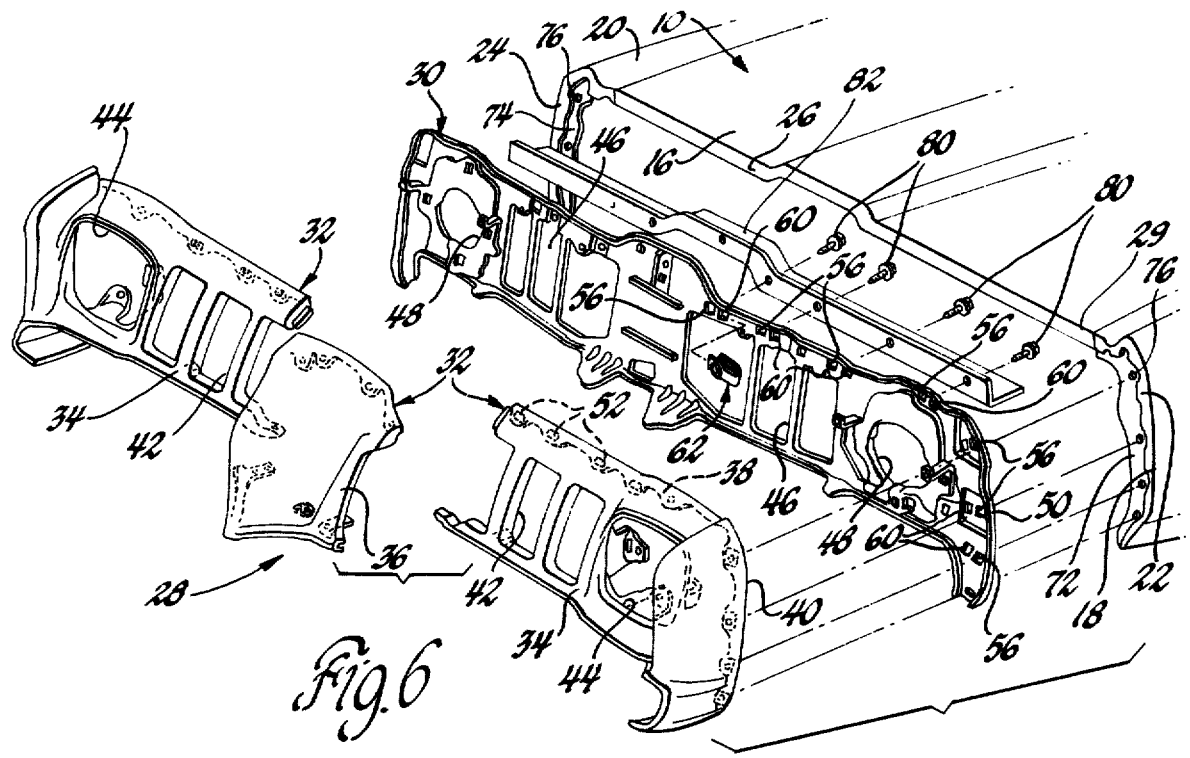
FIG. 6 is an exploded perspective view of a flexible panel subassembly according to this invention.

As seen best in FIGS. 1, 5 and 6, the flexible panel subassembly 28 includes a generally planar reinforcing panel 30 and a composite flexible panel 32 made up of two mirror image end sections 34 and a center section 36, the end sections and the center section being adapted for attachment to each other by conventional fastening techniques, not shown. The composite flexible panel 32 includes an integral rear flange 38 extending vertically along each side of the composite panel and laterally across the top of the latter, the rear flange defining a marginal edge 40 corresponding in contour to the contour of the edge 29 on the body portion. Forward of the rear flange 38, the composite panel exhibits a configuration designed for exterior attractiveness as well as functionality.

More particularly, referring to FIG. 1, the composite panel includes a plurality of apertures 42 for providing air flow to the radiator of the vehicle and a pair of laterally spaced headlamp apertures 44. With respect to exterior attractiveness, the marginal edge 40 corresponds closely to the marginal edge 29 on the body portion so that, as described more fully hereinafter, when the flexible panel subassembly is installed on the body portion a smooth and continuous surface is defined across the interface between the rigid sheet metal panels and the composite flexible panel.

The end sections 34 and the center section 36 are fabricated by conventional molding or casting techniques from an elastomeric material, as, for example, polyether urethane. As seen best in FIGS. 1, 2, 3 and 5, the composite panel embodies a relatively thin-wall type construction which walls, due to the inherent elasticity of the material, are unable to support the weight of the composite panel. Accordingly, the composite panel and each of the sections 34 and 36 making up the panel tend to sag, twist, bend and the like unless externally supported.

Referring now to FIG. 6, the planar reinforcing panel 30 is conventionally fabricated from sheet metal, as by stamping or the like, and includes a plurality of air passages 46 and a pair of transversely spaced headlamp clearance apertures 48. The reinforcing panel defines a marginal edge 50, a portion of which corresponds quite closely to the marginal edges 40 and 29 on the composite panel 32 and on the body portion 11, respectively. As described hereinafter, the reinforcing panel 30 functions as a base about which the flexible panel subassembly is constructed and as a support for maintaining the flexible panel sections 34 and 36 in a rigidified condition.

As seen best in FIGS. 1 through 6, the rear flange 38 of the composite flexible panel 32 has formed integrally on the rearward surface thereof a plurality of raised, generally square bosses 52, each having an aperture 54 therethrough. The bosses are spaced along and in generally close proximity to the marginal edge 40 of the composite panel. The reinforcing panel 30 includes a plurality of apertures 56 having shapes similar to the bosses 52 and corresponding in number and spacing with the bosses. The apertures 56 each include a dimension A, FIG. 2, oriented generally perpendicular to the marginal edge 50 of the reinforcing panel and a dimension B, FIG. 4, oriented generally parallel to that portion of the marginal edge 50 adjacent the corresponding aperture. Each boss 52 has dimensions corresponding to dimensions A and B of the apertures 56.

Figure 2:
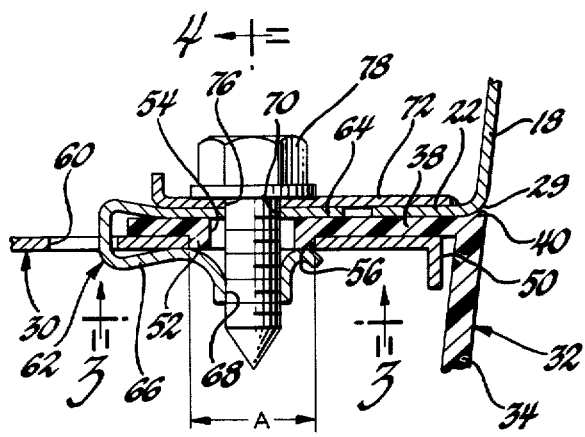
FIG. 2 is an enlarged sectional view taken generally along the plane indicated by lines 2—2 in FIG. 1.

As best seen in FIG. 2, the dimension of each boss 52 corresponding to dimension A is substantially equal to the latter so that when the boss 52 is inserted in the corresponding aperture 56, the boss is relatively rigidly restrained in a direction perpendicular to the adjacent section of the marginal edge 50 of the reinforcing panel and, hence, to the marginal edge 29 defined by the fenders 18 and 20 and the hood 16. However, as seen best in FIG. 4, the dimension of the boss corresponding to the dimension B is less than the latter so that a clearance 58 is provided between opposite ends of the aperture 56 and the boss. Accordingly, the boss is free to shift within the corresponding aperture but is constrained to shift primarily in a direction parallel to the adjacent section of the marginal edge 50 of the reinforcing panel 30.

Describing now the construction and installation of the flexible panel subassembly 28 and referring particularly to FIGS. 2 through 5, the reinforcing panel 30 is slightly smaller than the composite flexible panel 32 and is adapted to be located inboard of the rear flange 38 of the latter, and in juxtaposition with the flange, FIG. 2. Each of the bosses 52 is pressed or otherwise inserted into a corresponding one of the apertures 56 in the reinforcing panel and thus cooperates with the apertures and the reinforcing panel in rigidifying or maintaining the assembled configuration of the composite flexible panel thereby to prevent sags, twists and the like. Following assembly of the reinforcing panel on the composite flexible panel the various hardware elements, as for example the headlamp assemblies, are attached to the reinforcing panel and to the composite flexible panel by conventional fastening techniques, not shown. The flexible panel subassembly procedure is then completed.

The flexible panel subassembly is preferably constructed at a convenient location remote from the vehicle assembly area and means are, accordingly, provided for positively retaining the composite flexible panel on the reinforcing panel during subsequent handling procedures. More particularly, as seen best in FIGS. 2 through 5, each aperture 56 in the reinforcing panel has a companion aperture 60 adjacent thereto. Each companion aperture is adapted to receive therein a J-clip clamping member 62, including a pair of parallel leg portions 64 and 66 inherently spring biased toward each other. The leg 66 has a threaded aperture 68 therein in alignment with an aperture 70 in the leg 64. The J-clip 62 is inserted in the companion aperture 60 with leg 64 bearing against the outboard surface of the rear flange 38 of the composite flexible panel and the leg 66 bearing against the inboard surface of the reinforcing panel 30. Accordingly, the legs of the J-clips maintain the composite flexible panel in clamped relationship with respect to the reinforcing panel 30 thereby to prevent separation between the two during subsequent handling of the subassembly 28.

After the construction of the subassembly 28 is completed, the latter is moved directly to the vehicle assembly area or, more likely, to a storage area to await subsequent transfer to the vehicle assembly area. During this period of storage and transfer, the subassembly 28 is likely to encounter varying ambient temperature conditions which initiate thermal expansion or contraction of the elastomeric material from which the composite flexible panel is fabricated. Under these circumstances, the apertures 56 in the reinforcing panel function to direct the expansions and contractions generally parallel to the marginal edge 50 of the reinforcing panel. That is, since the apertures 56 permit movement of the bosses 52 only in a direction parallel to the adjacent section of the marginal edge 50, it follows that the expansions and contractions will be confined substantially to that direction. Accordingly, regardless of the ambient temperature changes, the peripheral contour defined by the composite flexible panel will be maintained in close correspondence to the peripheral contour defined by the fenders 20 and 22 and the hood 16 so that a smooth surface will be defined across the interface.

Figure 4:
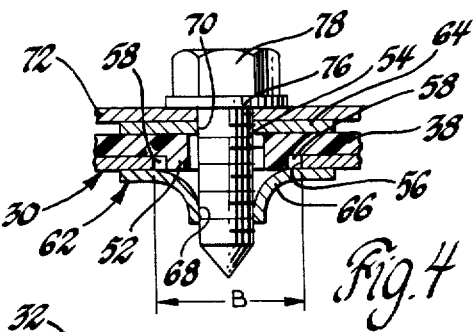
FIG. 4 is a sectional view taken generally along the plane indicated by lines 4—4 in FIG. 2.
Figure 3:
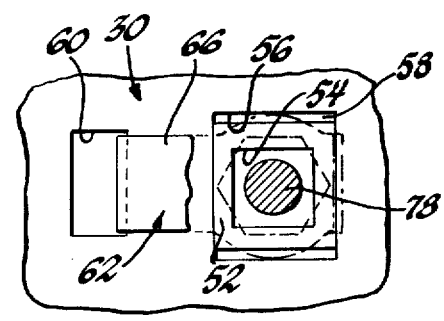
FIG. 3 is a partially borken away view taken generally along the plane indicated by lines 3—3 in FIG. 2.

When the flexible panel subassembly 28 is needed at the vehicle assembly area, it is transported from storage or directly from the subassembly area as a complete unit ready for installation. Once at the vehicle assembly area, an assembler aligns the subassembly 28 with the vehicle body at the transverse planar surface containing the front flanges 22 and 24 of the fenders and the front flange 26 of the hood. The front flanges 22 and 24 have rigidly attached thereto respective ones of a pair of backing plates 72 and 74, FIGS. 2 and 5. The backing plates 72 and 74 include a plurality of apertures 76 spaced according to the corresponding apertures 56 in the reinforcing panel. To install the subassembly 28 on the body portion 11, the former is aligned against the front flanges of the fenders and a plurality of fasteners 78, FIG. 4, are driven from behind the backing plates 72 and 74, through the aligned apertures 70 and 54 in the J-clips and the bosses 52, and into threaded engagement in the apertures 68 in legs 66 of the J-clips. As the fasteners are threaded down against the backing plate, the rear flange of the composite flexible panel is squeezed between the legs 64 of the J-clips and the rear surface of the reinforcing plate thereby to tightly secure the subassembly 28 on the body portion. During this procedure, the bosses 52 function to prevent twisting of the rear flange 38 and, hence, distortion of the marginal edge 40 in the event that the J-clip is urged into rotation by the torque applied to the fastener 78.

To complete the installation procedure, the reinforcing panel 28 is similarly attached through the J-clips and a plurality of fasteners 80 to a transverse radiator support 82 rigidly attached to the vehicle body structure below the level of the hood 16 in the closed position of the latter, FIG. 5. Finally, the collision bumper bar 27 is attached to the supports on the frame, not shown. In operation, of course, an impact on the composite flexible panel 32 causes the latter to deflect inwardly. After the impact ceases, the panel springs back to its original configuration due to the natural resilience of the material.

Figure 7:
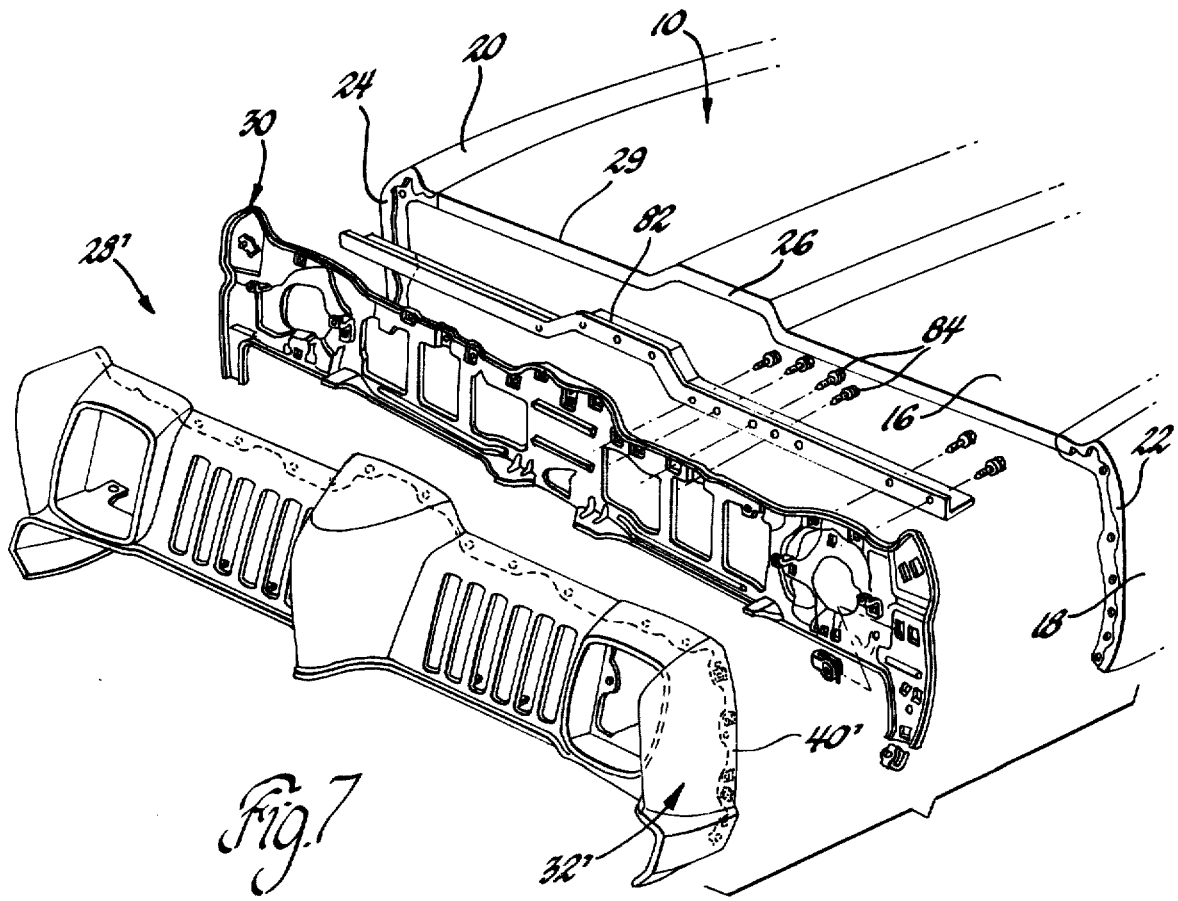
FIG. 7 is an exploded perspective view of a modified embodiment of a flexible panel subassembly according to this invention.

Referring now to FIG. 7 and describing a modified flexible panel subassembly designated generally 28', the latter is essentially identical to the subassembly 28 described hereinbefore except that the composite flexible panel 32 is replaced by a unitary panel member 32' which extends the entire width of the reinforcing plate 30. The unitary panel member 32' is fastened to the reinforcing panel in a manner similar to that described hereinbefore with respect to the composite flexible panel 32. However, the increased dimensional accuracy resulting from advances in elastomeric molding techniques now allows the removal of the bosses adjacent the horizontal portion of the marginal edge 40' of the unitary panel member. Accordingly, across the horizontal section of the marginal edge 40' of the unitary panel member, the latter is rigidly attached to the reinforcing panel 30 and the radiator support 82, through a plurality of ordinary press-in type fasteners 84. Along the vertical portion of the marginal edge 40', of course, the unitary panel member is attached to the reinforcing panel as described hereinbefore.

Having thus described the invention, what is claimed is:

1. A flexible panel subassembly for installation on a vehicle body defining a planar surface having a predetermined peripheral contour comprising, in combination, a planar reinforcing panel, a flexible elastomeric panel defining a flat mounting surface having a peripheral contour closely corresponding to said predetermined contour and adapted for attachment to said vehicle body at said planar surface, means on said flexible panel defining a plurality of integral raised bosses extending perpendicular to said mounting surface and disposed adjacent to and at spaced intervals along said flexible panel peripheral contour, the outer periphery of each of said bosses having a first dimension in the plane of said flat mounting surface and extending in a direction which is generally parallel to said peripheral contour and a second dimension in the plane of said flat mounting surface and extending in a direction which is generally perpendicular to said first dimension, means on said reinforcing panel defining a plurality of apertures corresponding in number to the number of said bosses, each of said apertures having a dimension corresponding to said first dimension exceeding the latter and a dimension corresponding to said second dimension substantially equal to the latter, each of said bosses being received in a corresponding one of said apertures so that said reinforcing panel cooperates with said bosses in maintaining said flexible panel in a rigidified condition while said apertures cooperate with said bosses in constraining thermal expansion and contraction of said flexible panel to a direction generally parallel to said peripheral contour of the latter, and resilient clamp means for clamping together said reinforcing panel and said flexible panel.

2. A flexible panel subassembly for installation on a vehicle body defining a planar surface having a predetermined peripheral contour comprising, in combination, a planar reinforcing panel, a flexible elastomeric panel defining a flat mounting surface having a peripheral contour closely corresponding to said predetermined contour, means on said flexible panel defining a plurality of integral substantially square raised bosses extending perpendicular to said mounting surface and disposed adjacent to and at spaced intervals along said flexible panel peripheral contour, the outer periphery of each of said bosses having a first dimension in the plane of said flat mounting surface and extending in a direction which is generally parallel to said peripheral contour and a second dimension in the plane of said flat mounting surface and extending in a direction which is generally perpendicular to said first dimension means on said flexible panel defining an aperture through each of said bosses, means on said reinforcing panel defining a plurality of apertures corresponding in number to the number of said bosses, each of said apertures having a dimension corresponding to said first dimension exceeding the latter and a dimension corresponding to said second dimension substantially equal to the latter, means on said reinforcement panel defining a plurality of companion apertures corresponding in number to the number of said apertures and disposed adjacent respective ones of said apertures, each of said bosses being received in a corresponding one of said apertures so that said reinforcement panel cooperates with said bosses in maintaining said flexible panel in rigidified condition while said apertures constrain thermal expansion and contraction of said flexible panel to a direction generally parallel to said peripheral contour of the latter, a plurality of U-shaped clamping members corresponding in number to the number of said bosses, each including a pair of legs biased toward each other, means on one leg of each of said clamping members defining a clearance aperture, and means on the other leg of each of said clamping members defining a threaded bore aligned with said clearance aperture, each of said clamping members being received in a respective one of said companion apertures with one of said legs engaging said flexible panel at said mounting surface and the other of said legs engaging said reinforcing panel thereby to clamp together said reinforcing panel and said flexible panel and with said clearance aperture and said threaded bore aligned with said aperture in the corresponding one of said bosses.

* * * * *